Patented Aug. 26, 1952

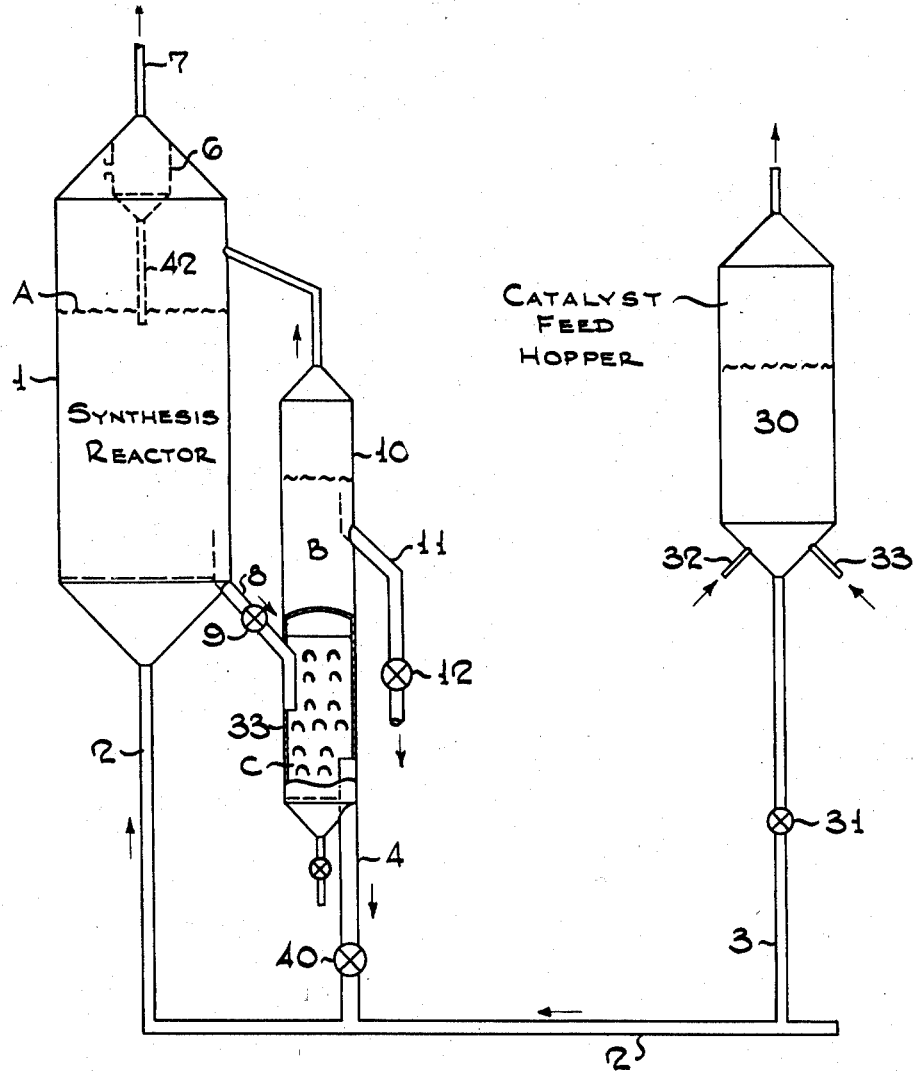

2,608,569

UNITED STATES PATENT OFFICE 2,608,569

REMOVAL OF CARBON FROM HYDROCARBON SYNTHESIS CATALYST

Charles E. Hemminger, Westfield, N. J., assignor to Standard Oil Development Company, a corporation of Delaware Application August 22, 1946, Serial No. 692,347

3 Claims. (Cl. 260—449.6)

The present invention is concerned with processes relating to the contacting of subdivided fine solid particles and gases. The invention pertains more particularly to a process of and an apparatus for contacting solids with upflowing gases in which the gases pass through an enlarged treating chamber containing a body of subdivided fine solids at a controlled rate to maintain the subdivided solids in a fluid phase, which phase is in a relatively turbulent, fluid ebullient state. My invention is especially directed to a process wherein a stream of subdivided fine solids are withdrawn from the enlarged treating chamber and segregated into more desirable and less desirable subdivided fine solids. The more desirable fine solids are returned to the treating chamber.

The invention is more specifically directed to an improved hydrocarbon synthesis process wherein the carbon content of the catalyst is positively controlled by employing a selective procedure for the withdrawal of the catalyst from the treating zone. In accordance with a specific application of my invention the carbon concentration on the catalyst in the hydrocarbon synthesis treating zone is controlled by withdrawing from the treating zone a stream of catalyst. This stream of catalyst is passed in a fluidized state to a separation zone or an elutriator. Separation is made in the elutriator between catalyst particles having a relatively high carbon content and catalyst particles having a relatively low carbon content. The catalyst particles having a relatively high carbon content are withdrawn from the system or passed to a regeneration zone while the catalyst particles having a relatively low carbon content are returned to the treating zone.

It has, heretofore, been known in the art to contact gases and solids by passing the gases upwardly through an enlarged treating zone, containing a body of finely divided solids to be contacted, at a controlled velocity to maintain the solids in the treating zone in a quasi-liquidlike state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate.

Fluid operations of the character described for contacting fine subdivided solids and gases have found extensive application in various reduction reactions, polymerization processes, exothermic and endothermic reactions, processes for the carbonization of finely divided coal and similar operations. Specific processes in which the solid fluid technique has been very successfully employed, are processes involving the treatment of petroleum oils, such as catalytic cracking operations, polymerization operations, and the like. The fluid technique has also been successfully utilized in synthesis of hydrocarbons, such as the Fischer synthesis reactions both for the production of synthesis gas itself and for the reaction of oxides of carbon and hydrogen for the production of hydrocarbon constituents containing one or more carbon atoms in the molecule. Thus, while the contacting of finely divided solids and gases in a fluidized bed, as presently practiced, has found extensive application, there are certain inherent limitations in some of the processes as now practiced which have thus far prevented adaptation in many other fields and which have limited its efficiency in many other fields in which it is now employed.

In some operations, for instance as in hydrocarbon synthesis operations, the overall rapid, swirling effect obtained by the circulation of solids through the reaction zone may be undesirable because it is not possible to segregate and separate from the reaction zone, a stream of solids which are anything more than an average mixture of solids contained in the zone. This is not desirable since if it were possible to selectively withdraw only the more contaminated particles the average efficiency of the remaining catalyst particles would be higher.

One purpose of my invention is to provide an improved method of, and apparatus for carrying out the contacting of gases and solids in the presence of a fluidized bed of the type described which would not be subject to the limitations mentioned. Another important object of my invention is to provide an improved method of rapidly and effectively separating fractions of subdivided solids of different buoyant properties or particle weights. Another object of my invention is to provide an improved method of maintaining two or more separate and contiguous beds of subdivided solids in open communication with each other. Another specific object of my invention is to provide an improved method of contacting gases with a relatively deep bed of fluidized solids. My invention is more specifically directed to improved hydrocarbon synthesis reactions, the scope of which will be understood by subsequent descriptions. My invention finds application in any treating operation wherein it is desirable to contact fine, subdivided solids with gases in order to effect a physical or chemical change in either solids or the gas and wherein it is desirable to employ selective withdrawal of the solid fluidized particles.

In accordance with a specific and limited application of my invention, substantial improvements are secured in a hydrocarbon synthesis reaction. In accordance with my process substantial economies are secured by utilizing a novel operating technique wherein the carbon build up on the catalyst is controlled by withdrawing a stream of fluidized catalyst from the treating zone and passing this fluidized stream to a separation zone wherein the more buoyant catalyst particles having the highest carbon concentration are segregated and removed from the system or passed to a regeneration zone. The less buoyant particles having a relatively lower carbon content are returned to the treating or synthesizing zone.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides of sodium, potassium, chromium, zinc, aluminum, magnesium, and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 700° F. The pressures, likewise, vary considerably and are a function of other operating conditions, such as catalyst employed, activity of the catalyst, character of the feed gases and the temperature utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, equal mols of hydrogen and carbon monoxide in the feed synthesis gases are desirable.

The synthesis feed gases comprising hydrogen and carbon monoxide are usually produced from hydrocarbons, particularly from methane or from natural gas. The reaction comprises oxidizing hydrocarbons with a reducible metal oxide. This procedure, per se, is old in the art since there are many disclosures concerned with the use of reducible metal oxides, such as oxides of iron, chromium, copper, nickel, manganese, and zinc for the oxidation of hydrocarbons comprising methane to produce hydrogen and oxides of carbon, particularly, carbon monoxide. These reactions are generally conducted at temperatures in the range from about 1400° F. to about 2000° F.

My invention finds specific application in a hydrocarbon synthesis reaction wherein the synthesis gases are reacted by means of a suitable catalyst to form hydrocarbon constituents containing more than one carbon atom in the molecule. For example, in this process one of the important problems confronting the development of the synthesis process is that carbon builds up on the catalyst to an extent that it is lost unless it is regenerated. Although, a certain amount of carbon may be desirable on the catalyst surface, this factor must be controlled, otherwise the catalyst deteriorates with a resultant loss of selectivity. For instance, as the carbon content of the catalyst increases, there is a progressive trend toward lighter hydrocarbons, including methane, in the product vapors. Also at the same time, as the carbon accumulates on the catalyst it disintegrates into finer particles. For example catalyst containing no 0–20 micron material and 75% of 80+ micron fraction will be altered in 200 hours to 50% of 0–20 micron material and 10% of 80+ material. The finer material contained the most carbon, 50%, compared to 20% for the coarse. In accordance with my process I therefore, can effectively control the character of the product gases and vapors by controlling the carbon content of the catalyst in the treating zone.

In accordance with my process I control the concentration of the carbon on the catalyst by withdrawing from the treating zone a fluidized stream of catalyst. This stream I pass to a segregation zone which preferably contains packing elements. In the segregation zone I control operating conditions so as to secure and take advantage of the difference in buoyancy between the catalyst particles containing a relatively higher and a relatively lower carbon content. The catalyst particles containing the relatively higher carbon content are finer and more buoyant and concentrate in the upper area of the fluid bed. From this area I withdraw from the system a fluidized stream of catalyst particles containing the higher carbon concentration. This stream may be passed to a regeneration zone or withdrawn from the system. The catalyst particles containing the relatively low carbon concentration are withdrawn from the segregation zone and returned to the treating zone.

As pointed out heretofore, in hydrocarbon synthesis and other catalytic reactions, such as bauxite treating, hydroforming and the like, small amounts of carbon are formed. While this carbon may be removed by burning with air, the additional equipment and expense are undesirable. This is particularly true when oxidation of the catalyst takes place at the same time the carbon is oxidized and it is necessary to reduce the catalyst before reintroducing it into the treating zone.

As discussed heretofore, it has been observed that the fluidizing characteristics or buoyancies of high carbon catalysts are different from those of low carbon catalysts. For instance, in hydrocarbon synthesis reactions an iron catalyst having a carbon concentration of less than about 10% will have a density of about 50 to 70 pounds per cubic foot in the reactor. However, as the carbon concentration of the catalyst increases to about 20% to 50%, the density in pounds per cubic foot decreases to less than about 20 pounds per cubic foot. In accordance with my invention catalyst is removed from the reactor and introduced into an elutriator or fluid separation zone. I prefer to use saddles or other equivalent nonfluidized solid packing elements in the bottom of the fluid separation zone and to employ a velocity [1] of 0.5 to 1½ feet per second, depending upon the pressure in the vessel and other operating conditions. The coarser and denser catalyst particles collect in the bottom of the vessel while the finer and lighter catalyst particles collect in the upper layer of the fluid bed. The solid nonfluidized elements give a more efficient separation of the relatively more buoyant and the relatively less buoyant catalyst particles. The catalyst withdrawn from the bottom of the separation vessel is returned to the main treating zone while the fine carbonized catalyst withdrawn from the top of the separation vessel is regenerated or removed from the system. In a hydrocarbon synthesis operation, the catalyst particles withdrawn from the top of the separation vessel will contain about 40% carbon when the average carbon in the treating zone is in the range from about 15% to 20% carbon; this latter value being optimum in regard to fluidization of the catalyst and synthesis yields. A preferred method of operating my process is to have about ½ to 3% preferably about 1% of the catalyst particles in the elutriator. In a typical hydrocarbon synthesis process, the catalyst particles removed from the top of the separation zone will have a micron size in the range from about 0 to 20 and will contain about 35% carbon, while the larger catalyst particles returned to the reaction zone will contain about 15% carbon. The catalyst which has been removed from the top of the separation zone may be discarded or it may be regenerated with oxygen containing gases in a separate regenerating vessel and returned to the reactor. The regenerated catalyst may also be recycled to a catalyst fusion operation so that it may be reincorporated into the fresh catalyst charge.

The process of my invention may be readily understood by reference to the attached drawing illustrating a modification of the same. Referring specifically to the drawing, feed gases comprising carbon monoxide and hydrogen are introduced into treating zone or synthesis reactor 1 by means of feed line 2. Prior to introducing these feed gases into treating zone 1 small fluid solid particles of a suitable synthesis catalyst are introduced by means of line 3. This catalyst is introduced from zone 30 which may comprise a feed hopper or a regeneration zone. The amount of fluid catalyst introduced into line 2 by means of line 3 is controlled by means of slide valve 31. The make up or fresh catalyst in zone 30 is maintained in a fluidized state by means of air or other suitable suspending fluid which is introduced by means of lines 32 and 33. Catalyst handled in a manner as hereinafter described is also introduced into line 2 with the incoming synthesis gases by means of line or conduit 4. The amount of catalyst introduced into line 2 by means of line 4 is controlled by slide or control valve 40. The synthesis feed gases flow upwardly through treating zone 1 which may or may not contain nonfluidized packing material. In general it is preferred that treating zone 1 does not contain solid nonfluidized packing elements. The catalyst particles usually have a micron size in the range from about 20 to 200 microns and higher. The velocity of the gas flowing up through treating zone 1 is sufficient to maintain the fine subdivided solid particles in a fluid ebullient state. The upper level of the catalyst bed is maintained at point A. The treated gases flow upwardly through treating zone 1, pass through cyclone separator or equivalent means 6 and are withdrawn from the treating zone by means of line 7. Cyclone separator or equivalent means 6 functions to remove entrained solid particles from the reactant gases. Separated solid particles removed from the gases in zone 6 are returned to the fluid bed by means of line 42. The overhead product gases removed by means of line 7 are handled in any manner desirable. A portion of these gases may be recycled or they may be condensed, and distilled or further treated.

In accordance with my invention I withdraw from treating zone 1 catalyst particles through conduit or line 8. The amount of catalyst withdrawn is controlled by means of valve 9. I pass this withdrawn stream into a lower section of elutriator or segregation zone 10. I prefer that this lower section of the elutriator 10 contain solid nonfluidizable packing elements. In accordance with my process the more buoyant, finer, highly carbonized catalyst particles segregate in upper area B of zone 10 while the coarser, less carbonized catalyst particles segregate in packed zone C. I withdraw from the upper level by means of conduit 11 the more buoyant, highly carbonized catalyst particles. The amount and quantity of particles withdrawn is controlled by means of valve 12. The less carbonized heavier particles I withdraw from zone 10 by means of conduit or line 4 and introduce these particles into the incoming feed gas stream.

In accordance with the preferred adaptation of my invention, there is placed within the reaction space of chamber 10 solid nonfluidized packing elements 33 of the type hereinafter described which are adequately spaced to provide free passage for the upflowing gases and solid fluidized catalyst particles. The packing is of the character which permits the maintenance of a fluid-like body of suspended solids between the spaces of the packing elements. The packing elements may be in the form of balls, spheres, cylinders, U-shaped elements, saddles, coils, metal turnings, helices, or equivalents. These packing elements are of sufficient sizes and weight to prevent being suspended in the gas vapors passing upwardly through the separation zone. The presence of these packing elements within the separation zone tends to prevent over all swirling or recirculation of the suspended solid particles within the zone. At the same time the formation of gas bubbles is avoided or if they are formed, they are dispersed so that a more intimate contact between the gases and solids is obtained. It is to be understood these elements may also be used in the reaction zone 1.

It is also to be understood that my invention will find application in operations in which it is desired to carry out the operation with either concurrent or countercurrent flow of one phase of the powder with respect to the gases.

By concurrent or countercurrent operation is meant the flow of suspended particles and suspending gases with respect to a fixed point in the treating zone. If both the gases and suspended particles flow in the same direction past said fixed point, the operation is concurrent with respect to gases and suspended particles. If the

---

[1] Velocity in the fluid separation zone provided no solids are present.

gases and suspended particles flow in the opposite directions past said fixed point, the operation is countercurrent with respect to gases and suspended particles. If a fluid bed is maintained in the reaction zone and there is no continuous withdrawal or addition of solid particles, the operation is neither concurrent nor countercurrent, although a swirling, ebullient motion of the suspended particles is secured in the zone due to the effect of the upflowing suspending gases. In order to secure flow of the suspended fluid particles, it is necessary to suspend the particles in a suspending gas or fluid and then to impose a fluid head. The fluid head may be imposed by mechanical means, such as, pumps and blowers, by a standpipe arrangement, by employing different packing sizes and the like. For example, one method of securing countercurrent flow is to introduce the solid particles at the top of the treating zone, to suspend the particles in the fluid state by means of an upflowing suspending gas and to draw off fluid suspended particles from the bottom of the treating zone due to the fluid head imposed by the height of the fluid bed. The withdrawn fluid suspended particles are generally, recycled either directly to the top of the treating zone or to a regeneration zone and then to the top of the treating zone. Recirculation in this manner may be secured by blowing with an air stream. On the other hand, if concurrent flow is desired, the solid particles may be introduced into the gas stream and the suspended particles along with the gases introduced into the bottom of the treating zone. A fluid head may be imposed on the stream introduced into the bottom of the treating zone by mechanical means, but is generally accomplished by a standpipe arrangement. The suspended particles, along with the suspending gases are withdrawn from an upper part of the treating zone due to the imposed fluid head.

My invention is applicable to all operations in which finely divided solids are continuously introduced into a reaction zone and are continuously removed therefrom, as well as to operations in which a body of finely divided solids is maintained within the treating zone. As discussed heretofore, the elutriator is filled, or partially filled, with packing or dispersing elements adequately spaced to provide a labyrinth of discontinuous passageways in which the gases are in contact with the finely divided solids, which are maintained in a quasi-liquid condition. These dispersing or packing elements prevent the overall swirling or rapid circulation of the solids throughout the full length and depth of the separation zone, and also tend to break up and disperse the larger gas bubbles which tend to form.

The size and character of the packing, as well as, its employment in the treating zone may vary appreciably. For example, the packing or dispersing elements may be dumped in the separation zone in a random fashion, or these packing elements may be made to assume predetermined geometric patterns. The dimensions and the type of the packing elements utilized may be varied considerably, depending upon the type of the separation zone employed, the velocity used, the particular catalyst particle being segregated. In general, the packing may vary from a minimum dimension of ¼ inch to a maximum dimension of 12 inches or more. Packing elements of the saddle type, having a maximum diameter of 1 inch to 2 inches (for example, Berl saddles), are particularly suitable for most reactors or treating zones. The packing or spacing elements should be shaped and arranged within the reactor so as to avoid extended horizontal surfaces on which the solid particles undergoing treatment can settle and collect.

The elutriator may have packing elements of different sizes in different vertical sections of the chamber. For example, the upper section of the chamber may be filled with relatively small packing elements and the bottom section filled with relatively coarse packing elements. In some cases it might be of advantage to have the coarse packing at the top and the fine at the bottom. Different size packing in top and bottom of the contacting zone is of particular advantage in effecting separation and classification of subdivided solids, and when it is desired to maintain two separate and distinct beds or a gradient of fluidized solids in a single reactor.

When the space occupied by the packing is not an important factor, the packing elements may be in the form of solid balls, spheres, cylinders, blocks, bricks and the like. However, where it is important to provide maximum reactor space with minimum volume occupied by the packing or spacing elements, it is preferable to provide elements which give a maximum surface. These elements may, for example, be in the shape of hollow cylinders, U-shaped elements resembling saddles, wire turnings, wire helices and the like. Raschig rings may be used as such. When using wire helices as packing elements, it is preferred to provide burrs or crimps in the wire as base points around the circumference to avoid interlocking of coils. When using saddle shaped elements, the elements should be designed to prevent close nesting of one saddle in another. The packing or spacing elements may be made of any desired material capable of withstanding the conditions of operation.

In order to successively maintain a quasi-liquid phase of subdivided gases and solids in the passageways between the packing elements, the subdivided solids or powder should be of such character as to be able to flow freely down through the interstices of the packing elements without becoming packed or agglomerated in the absence of an upflowing fluid. This quality of free flowing in the interstices of the packing in the absence of a suspending fluid is a function of factors, among which include the density of the subdivided particles, particle size, contacting zone size with respect to length as to width and particle size distribution. Thus, the finely divided solids used in the present invention must be of such particle size distribution so as to be free flowing without the aid of aeration. By this is meant for example, that if a body of said solids having all sides and the bottom supported, has the support on one side removed, the body will flow out that side in such a way as to leave a substantially, uniformly inclined surface. As pointed out heretofore, the body is free flowing if it will flow downwardly freely through the packing in the absence of aeration without bridging. In general, this characteristic is influenced by the content of fines in the subdivided solids having a diameter less than about 20 microns. Usually the content of such fines should not be greater than about 12% by volume since a percentage greater than this will render subdivided particles having particle distribution in the range from about 20 microns to 200 microns nonfree flowing. If the subdivided particles are free flowing, it is possible to fluidize the subdivided particles in the interstices of the packing regardless of the relative sizes of the packing, and the particle sizes of the subdivided particles providing the packing is sufficiently large to provide interstices each having a diameter greater than the diameter of the largest particle in the subdivided solids. In general, the packing should be such as to provide interstices having a length as compared to diameter of not greater than 15 to 1. Also, the packing should be at least about 10 times as large as the largest particle to be fluidized.

A further illustration of free flowing subdivided solids in the absence of aeration with respect to its successful fluidization between the interstices of solid nonfluidized packing in a treating zone is shown by the following data. The catalyst used was a silica gel catalyst impregnated with alumina (approximately 87½% silica and 12½% alumina).

| Silica-Alumina Catalyst Micron Size | Operation A | Operation B |
| --- | --- | --- |
| 0–10 | 6.8 | 3.2 |
| 10–20 | 8.8 | 7.3 |
| 20–40 | 19.1 | 24.1 |
| 40–80 | 36.8 | 35.8 |
| 80+ | 28.5 | 29.6 |
| Free Flowing Through Interstices of Packing (No Aeration) | No | Yes |
| Successful Fluidization In Interstices of Packing | [1] No | Yes |

[1] Secured surging and channeling.

In these and similar operations, the reactor size with respect to length as compared to width was 15 to 1 or less. The packing comprised commercial packing of the size from about ¼ to 2 inches. Commercial type packings were used, such as Berl saddles. The velocity [2] of upflowing gas was in the range from about 0.1 to 1.5 feet per second.

As another example, an iron catalyst having a micron size less than 44 was not free flowing in the absence of aeration through the interstices of the packing. This iron catalyst could not be successfully fluidized in a packed zone. On the other hand, an iron catalyst having a micron size in the range from about 100 to 250 flowed freely through the interstices of the packing and could be successfully fluidized.

Also, if a silica catalyst impregnated with alumina, as previously described, has a uniform micron size of about 45, it will neither flow freely between the interstices of packing, nor can it be successfully fluidized.

A further test of a free flowing body is that if such a body is packed under its own weight in a 60° funnel, it will flow through the funnel freely when released at the bottom. Whether or not small subdivided particles are free flowing will vary with different materials as described heretofore. However, its free flowing characteristics in the absence of aeration may be readily determined by a simple test of the character indicated above. If a finely divided solid material is not free flowing it can be made so by adjusting its particle distribution.

[2] Velocity in the treating zone provided no solids are present.

Having described the preferred embodiment of my invention, it will be understood that it embraces such other variations and modifications as come within the spirit and scope thereof.

I claim:

1. In a hydrocarbon synthesis process in which finely divided iron catalyst particles having a diameter size of from about 20–200 microns are maintained in a fluidized state in a synthesis zone and wherein the catalyst particles acquire carbonaceous deposits as a result of the synthesis reaction wherein the oxides of carbon are hydrogenated and whereby as the said catalyst acquires carbon its buoyancy increases, the improvement which consists in maintaining the catalyst in a well fluidized condition, and at the same time repressing the tendency of catalyst particles to become entrained in the product vapors issuing from the upper portion of the reaction zone, which consists essentially in flowing carbon oxides and hydrogen upwardly in contact with said finely divided iron catalysts at a rate such as to cause the formation of a dense fluidized bed, withdrawing catalyst from said reaction zone, charging the withdrawn catalyst to an elutriation zone, causing a gasiform material to flow upwardly in last-named zone in obstructed paths and at a rate such as to effect a separation of the catalyst particles according to their content of carbon, the catalyst particles containing the higher percentage of carbonaceous deposits concentrating in the upper portion of said elutriation zone while the particles containing a lesser amount of carbonaceous material concentrate in the lower portion of said elutriation zone, withdrawing the thus separated particles containing the lesser amount of carbonaceous deposits and returning the said portion to the reaction zone in such a quantity that the average carbon concentration on the iron catalyst in the reaction is from 15–20 weight percent.

2. The method according to claim 1 wherein about ½–3% of the total catalyst in the system is maintained in said elutriation zone.

3. The method according to claim 1 in which the said obstructed paths in the elutriation zone through which the gasiform material is caused to flow in effecting separation of the catalyst particles according to carbon content comprise solid non-fluidized packing elements disposed in the lower section of said elutriation zone.

CHARLES E. HEMMINGER.

REFERENCES CITED

The following references are of record in the file of this patent:

UNITED STATES PATENTS

| Number | Name | Date |
| --- | --- | --- |
| 2,362,270 | Hemminger | Nov. 7, 1944 |
| 2,393,554 | Ogorzaly | Jan. 22, 1946 |
| 2,406,851 | Redcay | Sept. 3, 1946 |
| 2,409,476 | Creelman et al. | Oct. 15, 1946 |
| 2,459,444 | Main | Jan. 18, 1949 |

OTHER REFERENCES

Copy of Complete Specification, British application 21,029.